US008388445B2

(12) United States Patent  
Pavlich et al.

(10) Patent No.: US 8,388,445 B2
(45) Date of Patent: Mar. 5, 2013

(54) SYSTEM AND METHOD FOR CONDUCTING A FANTASY SPORTS GAME

(75) Inventors: Charles F. Pavlich, Fair Oaks Ranch, TX (US); Kevin Stringer, Boerne, TX (US); Ken Anderson, Boerne, TX (US); Bart A. Meltzer, Corralitos, CA (US)

(73) Assignee: Fantasy Sports Now, Inc., Boerne, TX (US)

( * ) Notice: Subject to any disclaimer, the term of this patent is extended or adjusted under 35 U.S.C. 154(b) by 0 days.

(21) Appl. No.: 12/878,971

(22) Filed: Sep. 9, 2010

(65) Prior Publication Data

US 2011/0165946 A1  Jul. 7, 2011

Related U.S. Application Data

(60) Provisional application No. 61/259,720, filed on Nov. 10, 2009.

(51) Int. Cl.
*A63F 13/00* (2006.01)

(52) U.S. Cl. .................... 463/42; 463/9; 463/40
(58) Field of Classification Search .............. 463/42
See application file for complete search history.

(56) References Cited

U.S. PATENT DOCUMENTS

| | | | |
|---|---|---|---|
| 5,860,862 A | 1/1999 | Junkin | |
| 6,371,855 B1 | 4/2002 | Gavriloff | |
| 6,656,042 B2 | 12/2003 | Reiss et al. | |
| 6,669,565 B2 | 12/2003 | Liegey | |
| 7,001,279 B1 | 2/2006 | Barber et al. | |
| 7,351,150 B2 | 4/2008 | Sanchez | |
| 7,364,509 B2 | 4/2008 | Slade | |
| 7,458,093 B2 | 11/2008 | Dukes et al. | |
| 2002/0107590 A1 | 8/2002 | Liegey | |
| 2004/0266530 A1 | 12/2004 | Bishop | |
| 2005/0064937 A1 | 3/2005 | Ballman | |
| 2005/0164792 A1 | 7/2005 | Wilcock | |
| 2006/0217198 A1* | 9/2006 | Johnson | 463/40 |
| 2007/0243918 A1 | 10/2007 | Wojewoda et al. | |
| 2008/0051201 A1* | 2/2008 | Lore | 463/42 |
| 2008/0081700 A1 | 4/2008 | Biniak et al. | |
| 2008/0102911 A1* | 5/2008 | Campbell et al. | 463/9 |
| 2008/0287198 A1 | 11/2008 | Callery et al. | |
| 2009/0023495 A1 | 1/2009 | Koustas et al. | |
| 2009/0156312 A1* | 6/2009 | Ng et al. | 463/42 |
| 2009/0270172 A1* | 10/2009 | Sorrells et al. | 463/42 |
| 2010/0285857 A1* | 11/2010 | Anderson et al. | 463/9 |

* cited by examiner

Primary Examiner — Dmitry Suhol
Assistant Examiner — Ankit Doshi
(74) Attorney, Agent, or Firm — Kammer Browning PLLC

(57) ABSTRACT

A system and method for a fantasy sporting event game that reduces the requirement that the game player be skilled in the sport, or have knowledge of the sport. The method resolves the competition with a single actual sporting event as opposed to a season. The fantasy team players, chosen from players participating in the live sporting event, are randomly assigned to the fantasy teams. Team owners sign on after a live sporting event has been selected. Game players are then each assigned team members to fill out their rosters. An actual live player may be assigned to more than one team. Likewise, the fantasy teams established need not contain an actual live player from each of the positions for the particular sporting event. Variations as to the number of players on a fantasy team and the duration of the one-game time period are anticipated.

10 Claims, 11 Drawing Sheets

| Real Life Team/Player | Fantasy Team A | Fantasy Team B | Fantasy Team C | Fantasy Team D | Fantasy Team E | Fantasy Team F | Fantasy Team G | Fantasy Team H |
|---|---|---|---|---|---|---|---|---|
| Team X – QB1 | | | 8 | | 8 | | 8 | |
| Team X – WR1 | | 7 | | | | 7 | | 7 |
| Team X – WR2 | | | 4 | 4 | | 4 | | |
| Team X – WR3 | 2 | 2 | | | | | | |
| Team X – WR4 | | 0 | | 0 | | | 0 | |
| Team X – RB1 | 10 | | | 10 | | | | |
| Team X – RB2 | | 7 | | | 7 | | | 7 |
| Team X – RB3 | | | | 0 | | | | 0 |
| Team X – RB4 | | | | | 5 | | 5 | 5 |
| Team X – TE1 | 0 | | 0 | | 0 | | | |
| Team X – TE2 | | 6 | | | | | 6 | |
| Team X – K | | | | | 3 | | 3 | |
| Team X – Def | 4 | | 4 | | 4 | 4 | | |
| Team Y – QB1 | | 15 | | | 15 | | | 15 |
| Team Y – WR1 | 12 | | | 12 | | | | |
| Team Y – WR2 | | | 6 | 6 | | 6 | 6 | |
| Team Y – WR3 | | 0 | | 0 | | 0 | | |
| Team Y – WR4 | 0 | | | | 0 | | 0 | |
| Team Y – RB1 | | | | | | 9 | | 9 |
| Team Y – RB2 | | | 10 | | | 10 | 10 | |
| Team Y – RB3 | | | | | | 0 | 0 | |
| Team Y – RB4 | | 0 | 0 | | | | 0 | |
| Team Y – TE1 | 2 | | 2 | 2 | | | | |
| Team Y – TE2 | 0 | | | | 0 | | | 0 |
| Team Y – K | 3 | | | | 3 | | | 3 |
| Team Y – Def | | 8 | 8 | | 8 | | | |
| Points Totals | 33 | 45 | 42 | 37 | 50 | 40 | 32 | 52 |

Fig. 4

SYSTEM AND METHOD FOR CONDUCTING A FANTASY SPORTS GAME

CROSS REFERENCES TO RELATED APPLICATIONS

This application claims the benefit under Title 35 United States Code §119(e) of U.S. Provisional Patent Application 61/259,720 filed Nov. 10, 2009 the full disclosure of which is incorporated herein by reference.

BACKGROUND OF THE INVENTION

1. Field of the Invention

The present invention relates generally to systems and methods for carrying out fantasy sports competitions. The present invention relates more specifically to a game method of play associated with a fantasy sports competition between multiple fantasy game players in conjunction with a single live sporting event between two actual sports teams of live players.

2. Description of the Related Art

There are currently many different types of fantasy sports competitions being played in a variety of sporting event categories. Of these, some of the most popular game methods of play associated with fantasy sports involve the team sports of football, basketball, baseball, and hockey. Each of these existing game methods of play generally establish fantasy teams that are selected (drafted) by the team owners (the fantasy game players) which then compete against each other utilizing their selected team players as the basis for accumulating points on a periodic basis. In most instances, the accumulation of points occurs as the actual live players participate in actual live sporting events and achieve certain goals such as scoring points or accumulating other performance statistics associated with that particular sporting event.

One of the most common types of fantasy sports game involves fantasy football, based upon the actual games and actual players in the National Football League (NFL). Fantasy football is typically played over a sixteen game season, with games occurring on most weekends within the actual league season. Fantasy game players therefore compete against each other utilizing their selected (drafted) fantasy team as a basis for accumulating points based on actual players performances in the actual live sporting events.

The success of a fantasy sports game player (team owner) is almost without exception based in large part on the skill and ability of the team owner to select actual players that will achieve certain statistical goals in the games played during the season so as to accumulate the most points for the team owner in his or her play against other team owners in the fantasy sports league. Much attention is therefore given to predicting fantasy points that each actual live player might accumulate during the season or during a particular game on a given weekend within the season. Those who have the greatest skill at picking live players that will accumulate the most fantasy points for their team will generally succeed in winning their fantasy league. As a result of this skill requirement, most fantasy leagues are made up of fantasy game players that have or acquire some significant knowledge of the sporting event that they are participating in, as well as the various actual live players and teams that are involved in that sport.

There are a number of drawbacks to the basic premises associated with nearly all fantasy sport leagues and fantasy sport games. One drawback is the inability of a fantasy game player who has little or no knowledge of the actual game or the actual players to succeed (i.e., to win the fantasy league) where such knowledge in most instances determines success in picking (drafting) players for the fantasy teams. A second drawback to most of the fantasy game methods of play involves the long term play of the game that is required in order to accumulate points and therefore wins in fantasy competitions over the entire season for a particular sport. In other words, the winner of a particular fantasy league competition will generally not be determined until the end of an entire season, even though individual competitions may be resolved on a weekend or weekly basis.

It would be desirable if a fantasy sports game could be developed and promoted that did not require significant skill and knowledge on the part of the fantasy team owner (the fantasy game player) in order to succeed and potentially win the overall fantasy sports competition. It would further be desirable if a winner of the fantasy sports game method of play could be determined on a much shorter time scale, such as a single actual live game time scale, or a single weekend time scale, rather than the extended season long time scale normally associated with fantasy sporting events.

SUMMARY OF THE INVENTION

In fulfillment of the above and other objectives, the present invention provides a system and method for carrying out a fantasy sports game that eliminates, or at least significantly reduces, the requirement that the game player (the fantasy team owner) be skilled, or have significant knowledge of the sport and/or of the actual live players involved in the sport. The present method further provides a game method of play that resolves the competition on a much shorter time scale, namely, in association with only a single actual sporting event or game as opposed to a season long sequence of sporting events and games.

The method of the present invention involves a one game only competition between fantasy team owners that is associated with a single actual live sporting event, one that is preferably being broadcast on television in order that the fantasy participants may follow the game live (on television and/or online) and at the same time track their own players' performances in the actual game and in the fantasy competition. Rather than have team owners select and draft players for their teams, these actual players, chosen from those players who are participating in the live sporting event that has been selected as the basis for the game, are randomly assigned to the various fantasy teams that have been established for the one game only competition.

Team owners (the fantasy game players) sign on to the game after a specific actual live sporting event has been selected as the basis for the one game only competition. Individual fantasy game players (team owners) would then each be assigned team members to fill out their "rosters", although there is no requirement that each roster contain a number of players directly associated with the number of players on the team of the actual sporting event. The game method of play therefore allows an actual live player to be assigned to more than one of the fantasy teams that are established. Likewise, the fantasy teams established need not contain an actual live player from each of the various positions normally defined for the particular sporting event. As a result, there is a much more balanced field assigned between the various fantasy teams and therefore the fantasy game players. This results in a competition wherein the fantasy game players are more evenly matched and any one of the players has as much chance of winning the game as any other.

The actual sporting events that most lend themselves to being followed in conjunction with the game method of play of the present invention include team based sports such as football, soccer, basketball, baseball, rugby, hockey and lacrosse. Any of a number of additional team based sporting events could be utilized in conjunction with the game method of play described in the present invention. Slight variations as to the number of players on a fantasy team and the duration of the one-game time period are anticipated. Other variations will become apparent to those skilled in the art after a review of the appended drawings and the detailed description that follows.

BRIEF DESCRIPTION OF THE DRAWINGS

FIG. 4 is a sample data table representing the internal statistical translation of player performance data into point scoring for each of a number of fantasy teams according to the first (team owner driven) implementation of the method of the present invention.

DETAILED DESCRIPTION OF THE PREFERRED EMBODIMENTS

Figure 1:
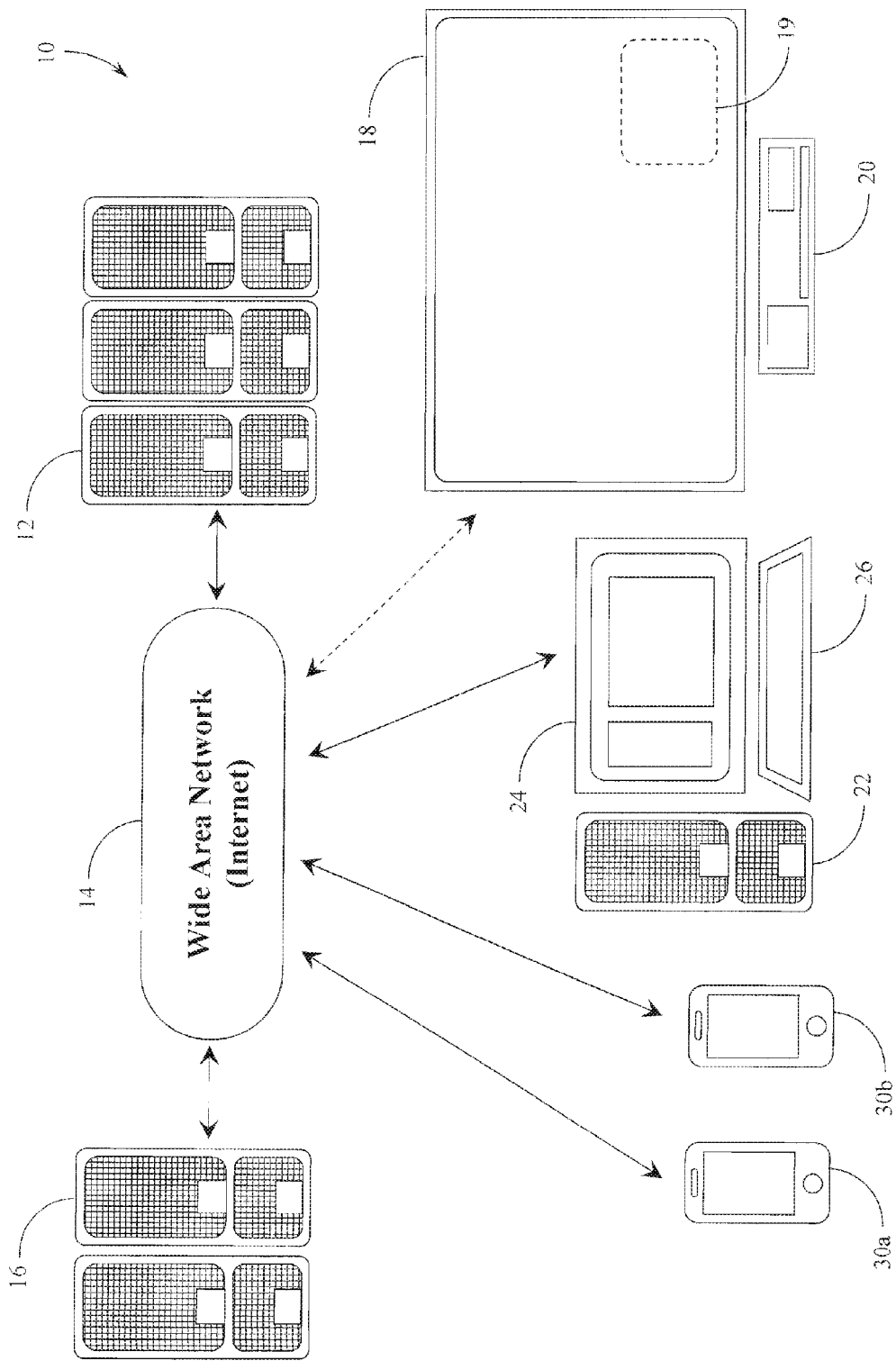
FIG. 1 is a partially schematic diagram showing the primary components of a broadcast and data communications network system appropriate for implementing the methods of the present invention.

Reference is made first to FIG. 1 for a detailed description of the various hardware components that facilitate carrying out the game method of play of the present invention. FIG. 1 represents in schematic form the various electronic, digital, and network components that would facilitate the one-game-only fantasy sports competition. The game system 10 is comprised primarily of an electronic data network that connects various electronic viewing devices that will allow the fantasy players to track both the real life game that is being followed and the accumulation of points for the fantasy teams established. A first computer system comprising the game method server 12 is provided to carry out the processing of the game method of play through access by the various fantasy players. Access is carried out by means of a wide area network 14 which, in the preferred embodiment, comprises access by way of the Internet. As the Internet is generally accessible through a number of different digital devices according to a number of different data transfer protocols, it is uniquely suitable for providing the kind of access required for carrying out fantasy sports competitions. In addition to the game method server 12, a statistical data subscription server 16 is essential for carrying out the game method of play of the present invention. Statistical data subscription server 16 is likewise accessible through the wide area network 14.

Also utilized in carrying out the game method of play of the present invention is the live television broadcast typically associated with the sporting events involved. Television display 18 may, in the preferred embodiment, be connected with a satellite/cable/television broadcast reception device such as television receiver 20 capable of receiving satellite/cable/broadcast television signals. A preferred embodiment of the broadcast reception service could also allow for display of the game day page of the present invention as a "menu-in-picture" 19. Also associated with the overall system would preferably be a desktop computer 22 which may either be a PC based computer or a Macintosh® based computer. Desktop computer 22 would have associated with it desktop computer monitor 24 as well as desktop computer data input device 26. This standard home computer set-up with Internet access would allow the fantasy game players (or the fantasy league commissioner) to select the particular live sporting event that they will follow within the game method of play, as well as allow individual fantasy team owners (or the league commissioner) to sign on for a game and in the preferred embodiment to pay a fee associated with participation in the game. Other devices that would likewise provide the necessary access to the game method server 12 could include smart phone mobile devices 30*a* and 30*b* (or further such devices as the fantasy team owners may require).

With the arrangement shown in FIG. 1 it is clear that although the preferred environment for the game would have all of the fantasy team owners physically present together at a location watching the live sporting event on the television, this is not an essential element to carrying out the game. The various fantasy team owners could in fact be in different physical locations watching the live sporting event on different televisions, and likewise could still follow their fantasy teams' accumulation of points by separate access to wide area network 14 and thereby to the game method server 12. Any combination of fantasy team owners being present together or being located separately are anticipated. Ideally, some level of communication between the fantasy team owners is desirable to add to the enjoyment associated with the one-game-only fantasy game method of play.

Figure 2:
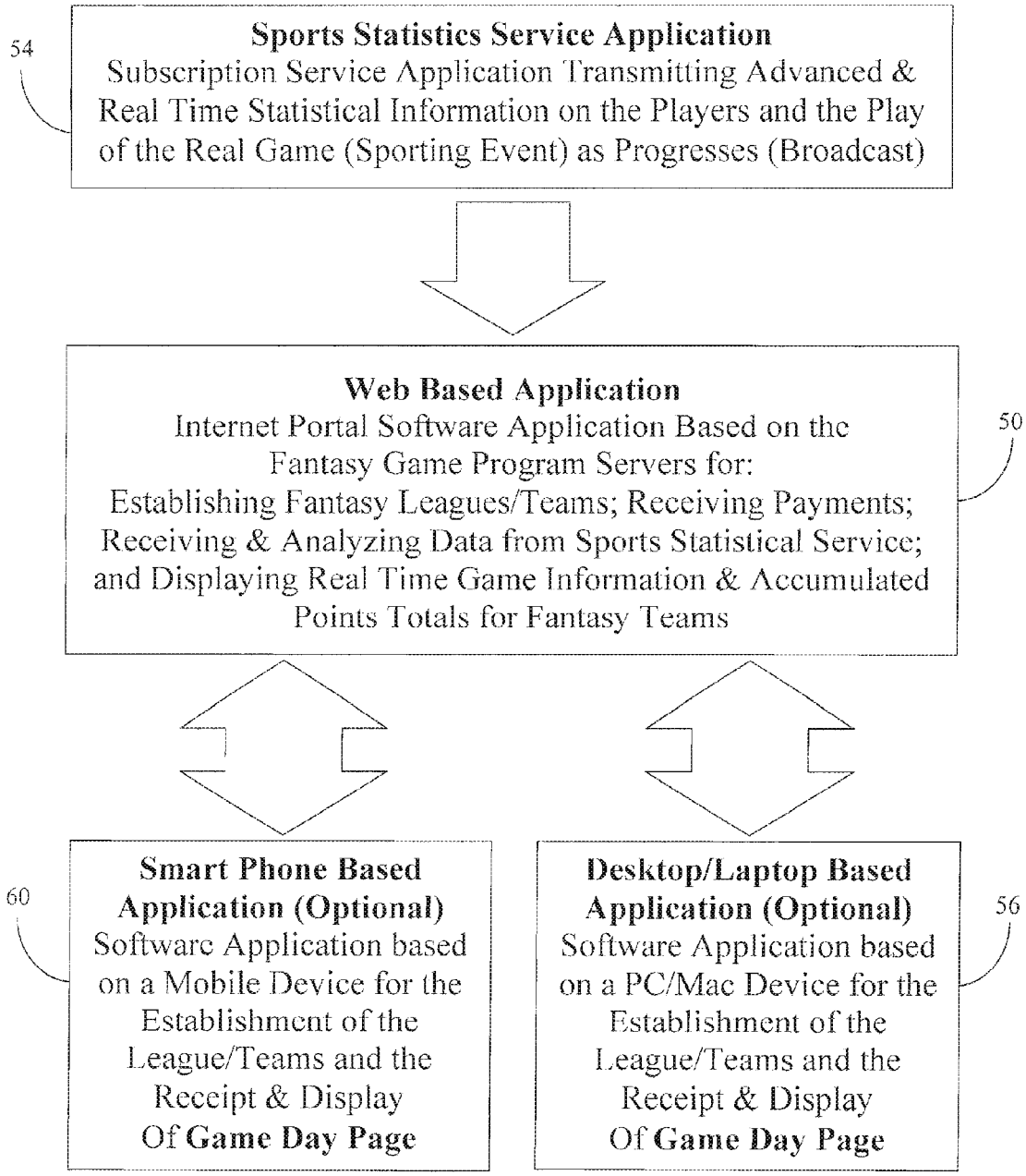
FIG. 2 is a block diagram showing the basic software and data application components appropriate for carrying out the functionality of the methods of the present invention.

Reference is now made to FIG. 2 for a detailed description of the various software application components associated with carrying out the game method of play of the present invention on the computer systems and digital networks described above in FIG. 1. FIG. 2 discloses the four basic software applications that may preferably be present in order to carry out the game method of play. Central to the game method of play is web based application 50 that comprises an Internet portal software application based on the fantasy game program servers (shown as server 12 above in FIG. 1) that operate to analyze the data received from a sports statistical service and thereafter display real time game information and accumulated point totals for the various fantasy teams involved. Web based application 50 is in data communication with sports statistics service application 54 which provides the all important subscription service application transmitting real time statistical information on the play of the real life game or sporting event. With the information from this outside statistics application, the web based application 50 is capable of providing (displaying) the necessary information to the fantasy game participants for the full enjoyment of the one-game-only sporting event fantasy competition.

Optionally connected with the web based application 50 are desktop/laptop based application 56 and smart phone based application 60. Each of these software applications may be downloaded by the fantasy game participants to their own respective preferred digital device for logging on, enrolling, and following the progress of the fantasy sports competition. Desktop/laptop based application 56 is a software application based on a PC/Mac device for the receipt and display of a game day page from the web based application 50. This game day page will provide one or more of the fantasy competition participants with the necessary access to select the live sporting event that is to be followed, as well as to enroll each of the fantasy team owners (fantasy players) into the system. In a preferred embodiment of the present invention, one individual among all of the fantasy competition participants may be selected as a league or game commissioner that initially handles the set-up and the selection of the fantasy game to be played. Thereafter, individual fantasy team owners sign on and/or enroll in a particular one-game-only event.

Smart phone based application 60 comprises a software application based on one or more mobile devices for the receipt and display of a game day page, preferably configured for the screen size and operating system capabilities of such mobile devices. Operating in a manner similar to the desktop/laptop based application 56, smart phone based application 60 allows individual fantasy competition players (fantasy team owners) to sign on and thereafter follow the progress of the fantasy team competition on the game day page.

Software application components 56 and 60 are described as optional in connection with the game method of play of the present invention insofar as some embodiments of the game method of play do not require interaction between the team owners and the operational system with regard to a two-way exchange of data. Where a league commissioner individually carries out the steps of establishing the fantasy league and each of the fantasy teams, and paying for the play of the fantasy game on behalf of all of the fantasy game participants, the smart phone and desk top/laptop systems may simply involve browser applications to allow the team owners to view the game day page. In such an environment, it would not be necessary to specifically download unique software applications and to rely instead completely on the web based application 50 as the means for enrolling and establishing the fantasy game and "broadcasting" the game day page by way of standard Internet browser functionality.

Figure 3:
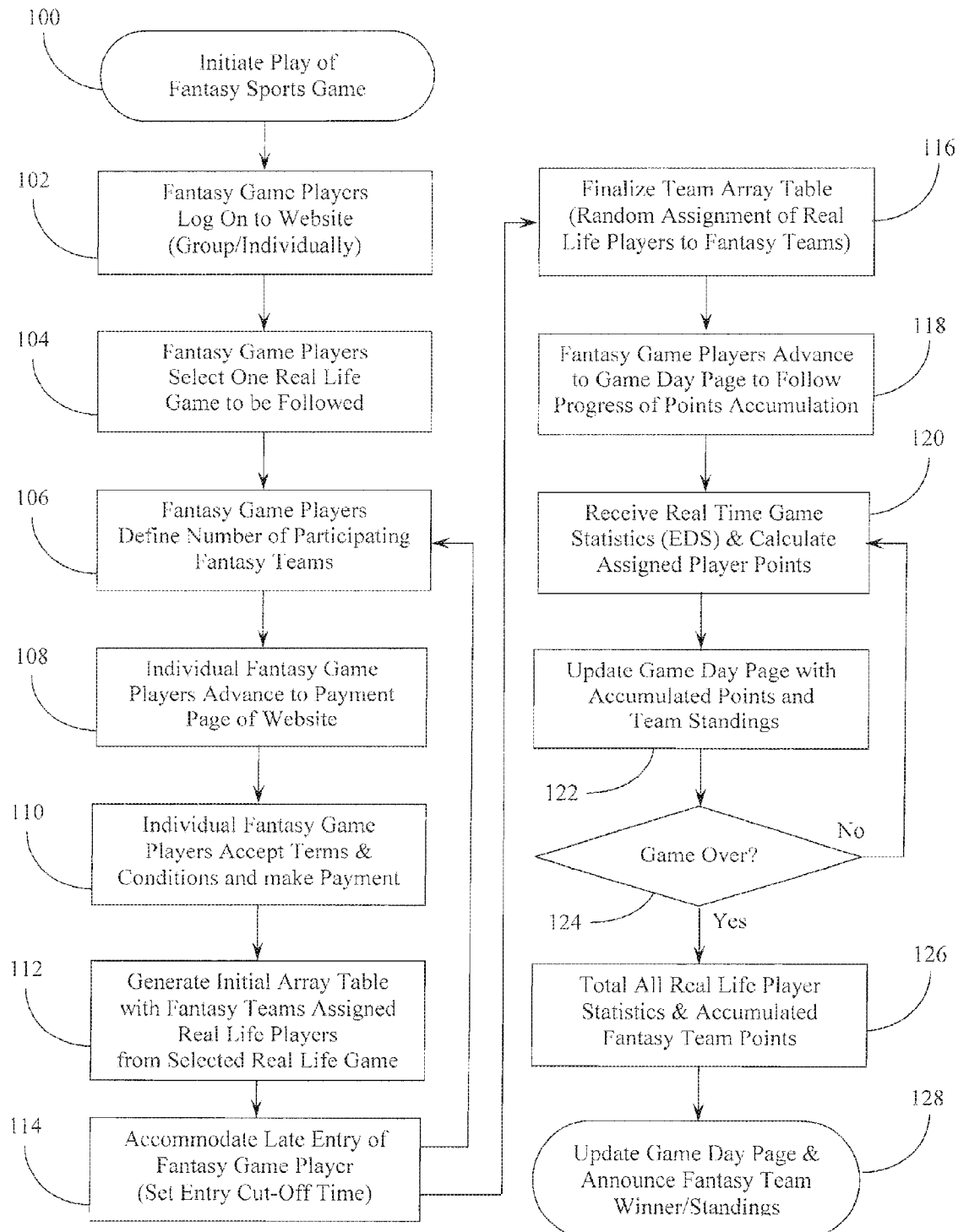
FIG. 3 is a flowchart showing the method steps associated with a first (team owner driven) implementation of the basic procedures and actions of the preferred embodiment game method of play of the present invention.

Reference is now made to FIG. 3 for a detailed description of the various steps associated with a first implementation of the basic game method of play of the present invention. At Step 100 the play of the fantasy sports game is initiated. Fantasy game players log on to the website either as a group or individually at Step 102. Collectively the fantasy game players then select one actual live game to be followed at Step 104. The fantasy game players then define the number of participating fantasy teams at Step 106, generally by having each of the fantasy team owners log on or sign on as a participant.

Individual fantasy game players (team owners) then advance to a payment page of the website at Step 108. The individual fantasy game players accept the terms and conditions of participating in the game and make payment for the same at Step 110. In the preferred embodiment, these individual fantasy game players (team owners) may have previously provided the necessary payment information in the form of credit card or PayPal® information, such that their signing on to participate in a particular game requires little in the way of additional time and effort. In addition to these pre-enrolled participants, new players or guest players in the fantasy competition could easily sign on, provide the necessary payment information, and accept the terms and conditions.

At Step 112 the system generates an initial array table (virtually) with the fantasy teams assigned real live players selected from the real live sporting event to be followed. The system anticipates the ability to accommodate the late entry of a fantasy game player at Step 114. Although an entry cut-off time does need to be established as the participants will be following a real live game with a start time that is externally set and is not flexible. The ability to add the late entry of a fantasy game player at Step 114 is simply a matter of repeating Steps 106, 108, 110, and 112 to accommodate the additional player.

The team array table is finalized at Step 116 wherein the random assignment of real live players to each of the fantasy teams is carried out. The fantasy game players then advance to the game day page at Step 118 to follow the progress of point accumulation during the actual sporting event as it occurs. The system receives real time game statistics through an electronic data server at Step 120 and then calculates the assigned player points for each of the fantasy teams that have been established. The system updates the game day page with accumulated points and team standings at Step 122. In the process, the system constantly determines whether the real life game in question has ended at decision Step 124. If not, the process returns to the reception of real time game statistics at Step 120 and continues to update the game page as necessary at Step 122.

Once the real life game has ended, the process proceeds to Step 126 wherein all real live player statistics are totaled and accumulated to provide the fantasy team points to finally score. Finally, at Step 128 the system updates the game day page with the totals and announces the fantasy team winner along with the fantasy team standings associated with the accumulated points.

Reference is next made to FIG. 4 for a detailed description of a typical points table that may be virtually established within the first implementation of the game method of play of the present invention on the game server system. This graphic representation of the points table provides additional information as to the manner in which individual actual live players are assigned to different fantasy teams, as well as the manner in which points are accumulated and totaled during the play of the actual sporting event. Although the table shown in FIG. 4 may not actually exist on a piece of paper, or as the means for displaying information on the game day page, it is exemplary of the manner in which the game method of play carries out the process of accumulating points among the various fantasy teams.

Points table 150 comprises columns associated with each of the fantasy teams, as for example, column 130 is defined as Fantasy Team A. The rows in the points table 150 shown are generally associated with assigned live players selected from the actual sporting event teams (Teams X & Y in the example shown) and identified by their respective positions on the team. An example of this is shown where a row identifies one quarterback (QB) from Team X as a real live team player 136. The identification of the player position is not important in terms of the manner of randomly assigning players to the fantasy teams, but rather is important only to establish that the particular player will likely participate in the real life game sporting event competition. In other words, although a given Team X may have more than one quarterback, the likelihood that a second or third string quarterback will participate in the live sporting event may be small. It would therefore not be desirable to include second and third string quarterbacks in the list of available players to be assigned to the fantasy teams.

In the example shown in FIG. 4 the first string quarterback associated with Team X shown at 136 has been assigned to three separate fantasy teams, namely Fantasy Team C, Fantasy Team E, and Fantasy Team G. This shows a critical feature of the present invention that distinguishes it from most other fantasy sports competitions, namely the possibility that a given actual live player may be assigned to more than one fantasy team.

The numbers shown in the body of the points table 150 represent the accumulated fantasy points that each particular player has accumulated for each of the fantasy teams to which that player is assigned. In the example given above, the quarterback from Team X has accumulated a total of eight fantasy points for each of the fantasy teams that that player is assigned to. Therefore, Fantasy Team C has accumulated eight points shown at 132 in table 150, as well as Fantasy Team E accumulating the same number of points shown at 134. Totals for each of the fantasy teams are shown near the bottom of points table 150 wherein Fantasy Team A has accumulated thirty-three points in total as shown at 144, and Fantasy Team H has accumulated fifty-two points in total shown at 142.

Points table 150 shown in FIG. 4 may in a preferred embodiment represent the status of the points accumulation mid-way through a typical sporting event, which in this case represents a football game. As indicated above, variations on the number of players that are assigned to each fantasy team, and indeed the number of points that each player might accumulate for a given statistical performance could vary significantly for different types of sporting events. Each of these variations are anticipated under the general game method of play associated with the present invention.

Those skilled in the art will recognize that the manner in which individual real life players accumulate points for their respective fantasy teams is a matter of defining the rules of the fantasy competition based upon statistics reflecting the actual play of the players in the live sporting event. There are many variations on these rules and most all of these variations are applicable to the game method of play of the present invention. Because each of the real life players may likely be assigned to any of the fantasy teams, there is a balance that can be derived that allows somewhat more freedom in the manner in which the players' statistics translate into fantasy points. As with many existing fantasy sports competitions, these points rules can, in some embodiments of the present invention, be changed and agreed upon by the fantasy players.

It will be recognized by those skilled in the art that the basic game method of play of the present invention may be implemented by each of the individual fantasy game participants, as described above, or may be established and initiated by a single participant or individual acting as league commissioner. In a preferred embodiment implemented on the same network system described above, a single individual, known as the fantasy league commissioner, may carry out the steps associated with establishing the single game fantasy league as well as the various fantasy teams that comprise the league.

Figure 5:
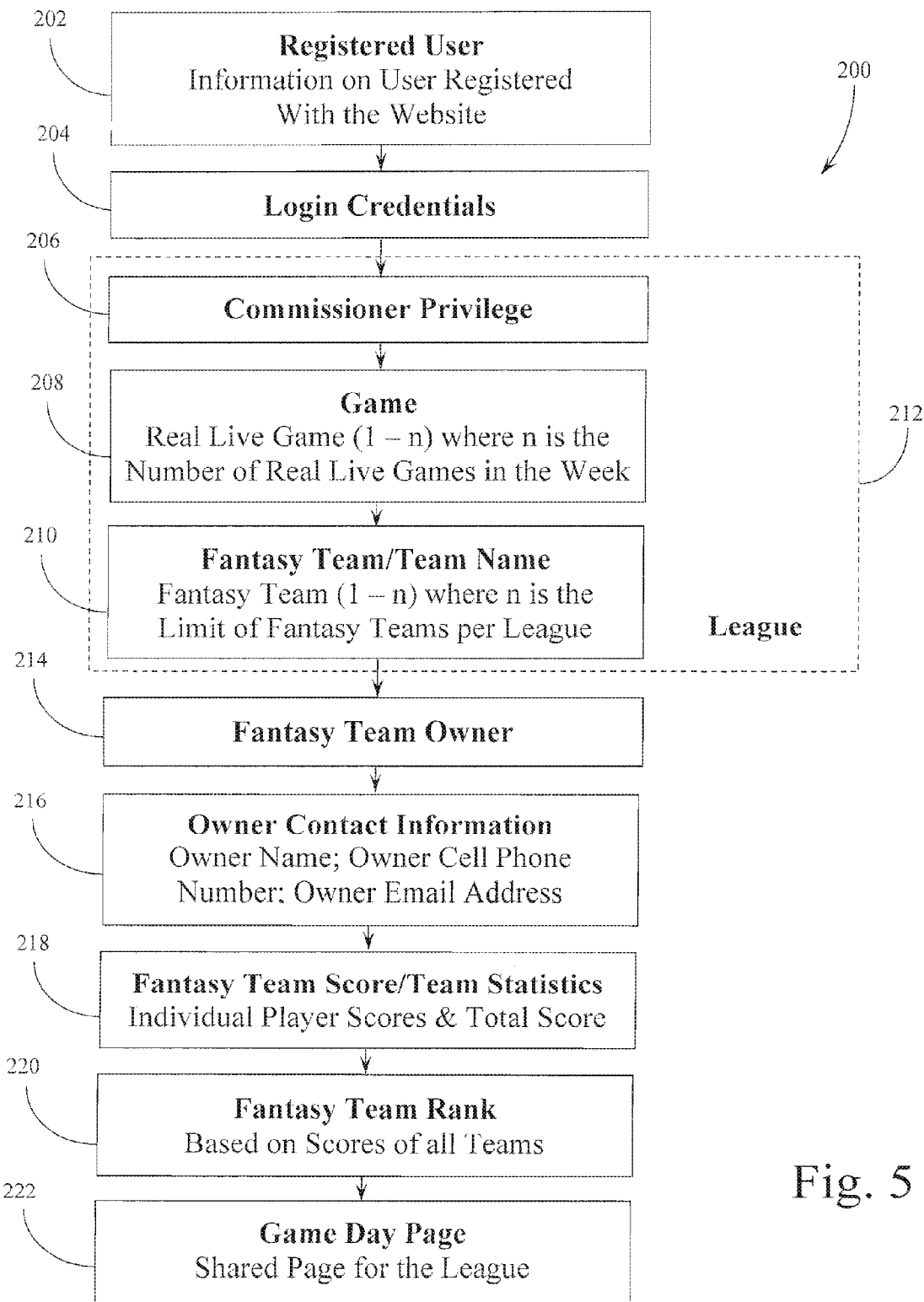
FIG. 5 is a relational data structure diagram showing the basic data objects participating in a second (league commissioner driven) implementation of the basic procedures and actions of the preferred embodiment game method of play of the present invention.

Reference is made to FIG. 5 for an overview of such a preferred embodiment, providing a relational data structure diagram characterizing the basic data objects and elements participating in this second (league commissioner driven) implementation of the basic procedures and actions of the preferred embodiment game method of play of the present invention. FIG. 5 does not represent specific data tables constructed within the operational system of the present invention, but rather represents data centers or actors that, in their relationship to one another, characterize the overall system and method of this preferred embodiment.

Data structure environment 200 begins with the information and data associated with registered user 202. This information and the processes associated with establishing an individual as a registered user (and thereafter as a league commissioner) are generally described in more detail below, but essentially comprise the gathering and storage of standard information associated with identifying and contacting the individual registering to play the game. The information may further include payment information, as in this embodiment the league commissioner or registered user is also the individual that carries out payment for the establishment and play of the fantasy game. Once registered user 202 is established, the individual is provided with log-in credentials 204. These log-in credentials 204 allow the registered user to access the system and establish a fantasy league with a specified number of fantasy teams for a specific fantasy game. This process of registration and logging in establishes commissioner privilege 206 which is the first component in the establishment of the fantasy league 212.

The second component in fantasy league 212, as shown in FIG. 5, comprises the data and information involving the real live game 208. This real live game may be identified as one of real live games 1-n where n is the number of real live games being held during the week in the real sports league. As the third component in the establishment of fantasy league 212, the information necessary for each of the fantasy teams/team names 210 is provided by the league commissioner. These fantasy teams 1-n, where n is the limit of fantasy terms per league, are established based on information provided by the league commissioner upon carrying out the process for the same as described in more detail below. Within the league, there are a number of fantasy team owners 214 each with owner contact information 216 which may, in the preferred embodiment, simply include the owner's name and a cell phone number or email address by which the team owner may be contacted to communicate information about the play of the game, both prior to and during the actual real live game.

Associated with each fantasy team are fantasy team during the play of the game are fantasy team score/team statistics 218 which comprise the individual player scores for those players assigned to the individual team and a total score that comprises the that team's competitive number by which the teams are ranked within the one time fantasy game. The above score accumulations for each of the team owners and teams result in a fantasy team rank 220 that is based on the scores of all the teams. This information is maintained in an ongoing basis during the play of the real live game and, of course, comprises a total at the end of the real live game and the fantasy game in order to declare a winner of the fantasy game.

Most of the above information is provided (displayed back) to the league commissioner and the team owners in an ongoing basis during the play of the fantasy game (i.e., the play of the real live game) through game day page 222. On this page, described in more detail below, all of the information regarding the player scores, team scores, and team ranks is provided in a single display page on a variety of different display components within the system.

Figure 6:
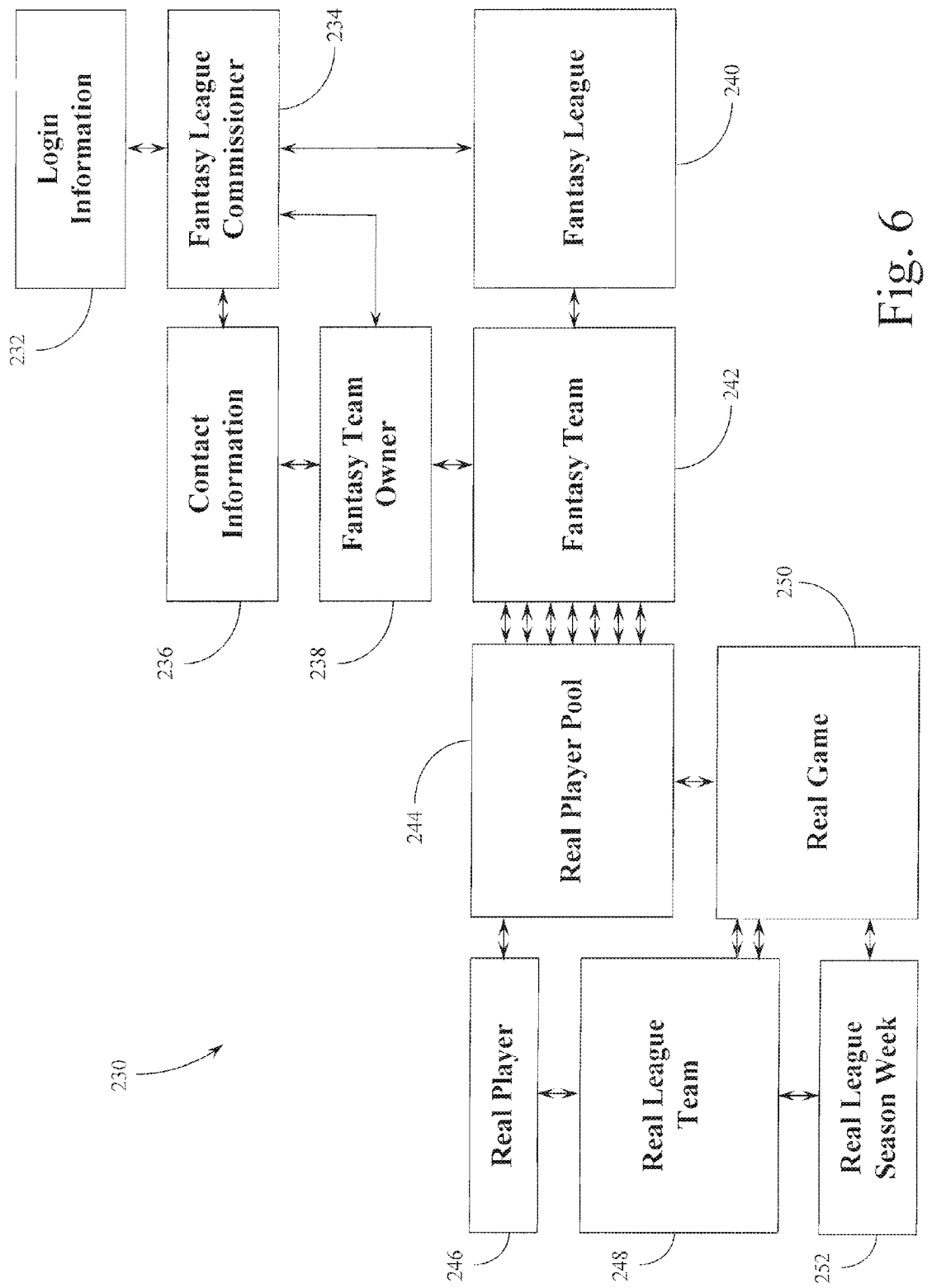
FIG. 6 is a database schema diagram showing the basic data tables and the flow/exchange of data sets between the tables in the second (league commissioner driven) implementation of the basic procedures and actions of the preferred embodiment game method of play of the present invention.

Reference is now made to FIG. 6 for a more detailed description of the data tables that comprise the data processing system associated with carrying out the methods of the present invention. FIG. 6 represents all implementation of the present invention wherein a fantasy league commissioner initiates the game and establishes most of the information necessary for the automatic generation of the various teams within the fantasy league. FIG. 6 is a data base schema diagram that shows the basic data tables and the flow/exchange of data sets between these tables in this second (league commissioner driven) implementation of the basic procedures and actions of the preferred embodiment game method of play of the present invention.

In contrast to FIG. 5 referenced above, FIG. 6 shows the more specific data table structures and the data connections that allow for the exchange of data (modifications of the various electronic data base structures). This diagram provides a representative one of a number of sets of "real environment" data tables associated with the real live games (on the left hand side of the diagram) and a representative one of a number of sets of "fantasy environment" data tables associated with each of the fantasy teams within each of the fantasy leagues established (on the right hand side of the diagram). In other words, the data tables shown in FIG. 6 on the left hand side of the diagram are representative of one of fifteen or sixteen (as an example) real live games that may actually be played during the week in the real sport leagues seasonal competition. For each one of these real live games and the data tables associated with them, there are a large number of fantasy leagues that have been established, and within each fantasy league, two to as many as ten or more individual fantasy teams. The fantasy league data tables and the fantasy team data tables are represented individually by the data tables shown on the right hand side of the diagram in FIG. 6. The flow of data that is necessary to carry out the play of the game methods of the present invention is schematically characterized by the seven arrows positioned in the center of the diagram in FIG. 6, representing data associated with seven players on a fantasy team 242 drawn from a larger real player pool 244. For each fantasy team involved in the play of the game of the present invention, this data transfer occurs in order to provide real time updates regarding the individual fantasy team's score and rank in the fantasy league game.

Data schema 230 shown in FIG. 6 again comprises, on the left hand side of the diagram, the "real environment" data tables associated with each of the real games that may be played during a given week of the real leagues season. As mentioned above, the basic component in these data tables is real player pool 244 which provides a listing of each of the players on each of the two teams that may be participating in the real live game that has been chosen as the basis for the fantasy game. Real player pool 244 is of course a sub-set of all of the real players present in the league and may be drawn from real player data table 246. Real player data table 246 is functionally connected with real league team 248 which is one of two such data tables as defined by real game 250. Both of these data table components (real game 250 and real league team 248) are established by real league season week data table 252 which comprises the schedule for the real league. Collectively, these data tables associated with the "real environment" provide to each fantasy team 242 the relevant statistical information associated with each of the seven (for example) players that have been assigned to that fantasy team.

The "fantasy environment" data tables shown on the right hand side of the diagram in FIG. 6 are, as mentioned above, multiplied by each of the number of fantasy leagues and by each of the number of fantasy teams within each league. In this set of data tables, the basic information associated with establishing the fantasy league is provided by log in information 232 in connection with the fantasy league commissioner 234. Contact information 236 is provided for both fantasy league commissioner 234 and for the fantasy team owners 238. The fantasy league commissioner 234 establishes the fantasy league data table 240 and functions in association therewith as well as with the fantasy team owner data tables 238. The actual establishment of the fantasy team data table 242 is carried out in a double randomized, automated fashion based upon access to the information in real player pool data table 244. The manner in which this assignment is carried out and by which the fantasy teams are established, is described in more detail below.

It will be understood by those skilled in the art that the information and structure contained within each of the data tables described in FIG. 6 will be highly dependent upon the specific sporting event that the fantasy sports game is based upon. The number of players that are assigned to each fantasy team, the manner in which points are scored, the frequency of the occurrence of the real live games, the duration and breakdown of the play of the games, and so one, are all very dependent upon the type of sport involved. Each of these variables may be structure to appropriately fit within the confines of the data tables shown in FIG. 6 and may be adapted for the most efficient play of the fantasy game associated with the particular real live sporting event that is being followed. The overall objective in each case is to allow the play of a fantasy game to occur during the confined time period associated with the actual play of a real live sporting event.

Despite the preference for play of the fantasy game coincident in time with the real game, it is possible that the same methods associated with the present invention could be carried out with a sporting event that is not experienced in real time. In other words, while the use of a real live sporting event is an important element in the enjoyment in the game method of play of the present invention, it is not essential. Each of the steps associated with the game method of play of the present invention could be carried out in conjunction with a recorded sporting event whereby the individuals acting as fantasy team owners may or may not know the outcome of the actual sporting event being followed. Because of the randomness associated with the establishment of each of the fantasy teams (described in more detail below) there is little to be gained or lost (in terms of winning the fantasy game by knowing the actual outcome of the real game. Nonetheless, an individual that is aware of the result of the actual game may be able to predict the outcome of the fantasy game once the fantasy teams have been randomly assigned. This, of course, can detract from the enjoyment of the game, but not to an extent that play of the game according to the methods described herein is not still possible.

Figure 7:
FIG. 7 is a flowchart showing the basic method steps associated with the process of initially registering a league commissioner in the second implementation of the preferred embodiment methods of the present invention.

Reference is now made to FIGS. 7-11 for a more detailed description of the manner in which the fantasy league and fantasy teams of the game method of play of the present invention are established and the game method of play is actually carried out. FIG. 7 represents the initial registration process, beginning with Step 260 wherein a new fantasy league commissioner is established by an individual choosing to register at the website associated with the on-line implementation of the game of the present invention. This is followed at Step 262 where the new fantasy league commissioner provides the necessary personal data to not only identify the fantasy game and the fantasy league but to also direct communication back and forth with the fantasy league commissioner. In this process, the new fantasy league commissioner chooses a password at Step 264 and then confirms data entry at Step 266. This simple and well-known process results in the registration of an individual with commissioner privilege at Step 268.

Figure 8:
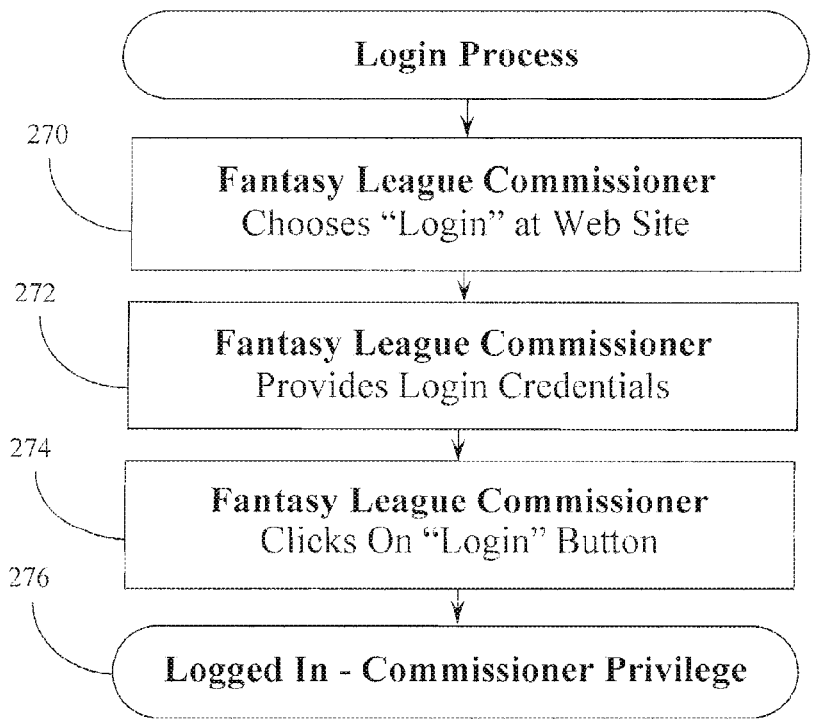
FIG. 8 is a flowchart showing the basic method steps associated with the process of logging in by the commissioner in the second implementation of the preferred embodiment methods of the present invention.

FIG. 8 represents a similarly well-known process for logging into the system wherein the fantasy league commissioner chooses to initiate the fantasy game at the on-line website at Step 270. The league commissioner provides log in credentials at Step 272 and clicks on the "log in" button to enter the system at Step 274. This brief process results in the league commissioner being logged in with commissioner privilege at Step 276.

Figure 9:
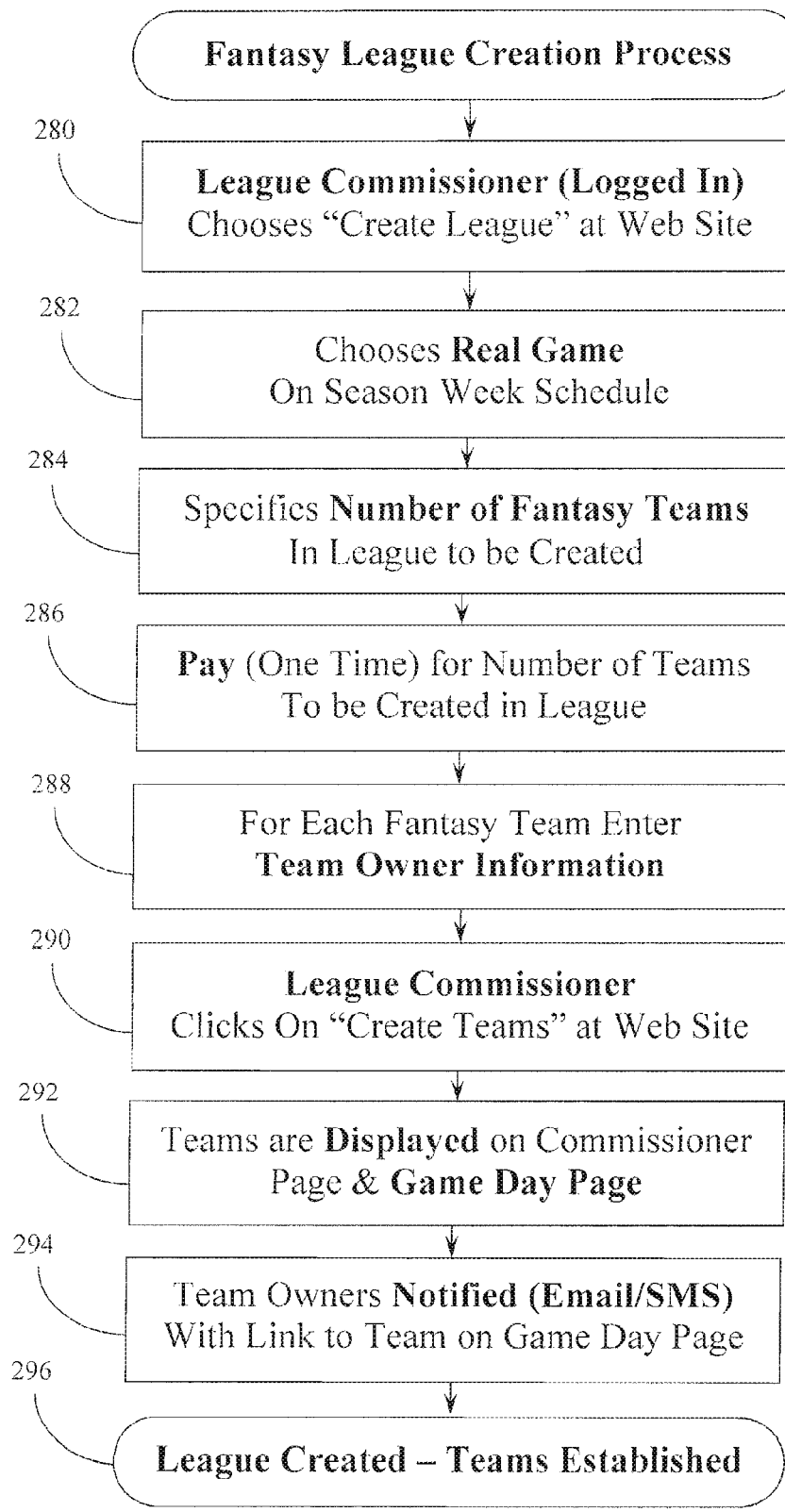
FIG. 9 is a flowchart showing the method steps associated with the process of establishing the fantasy league/teams in the second implementation of the methods of the present invention.
Figure 10:
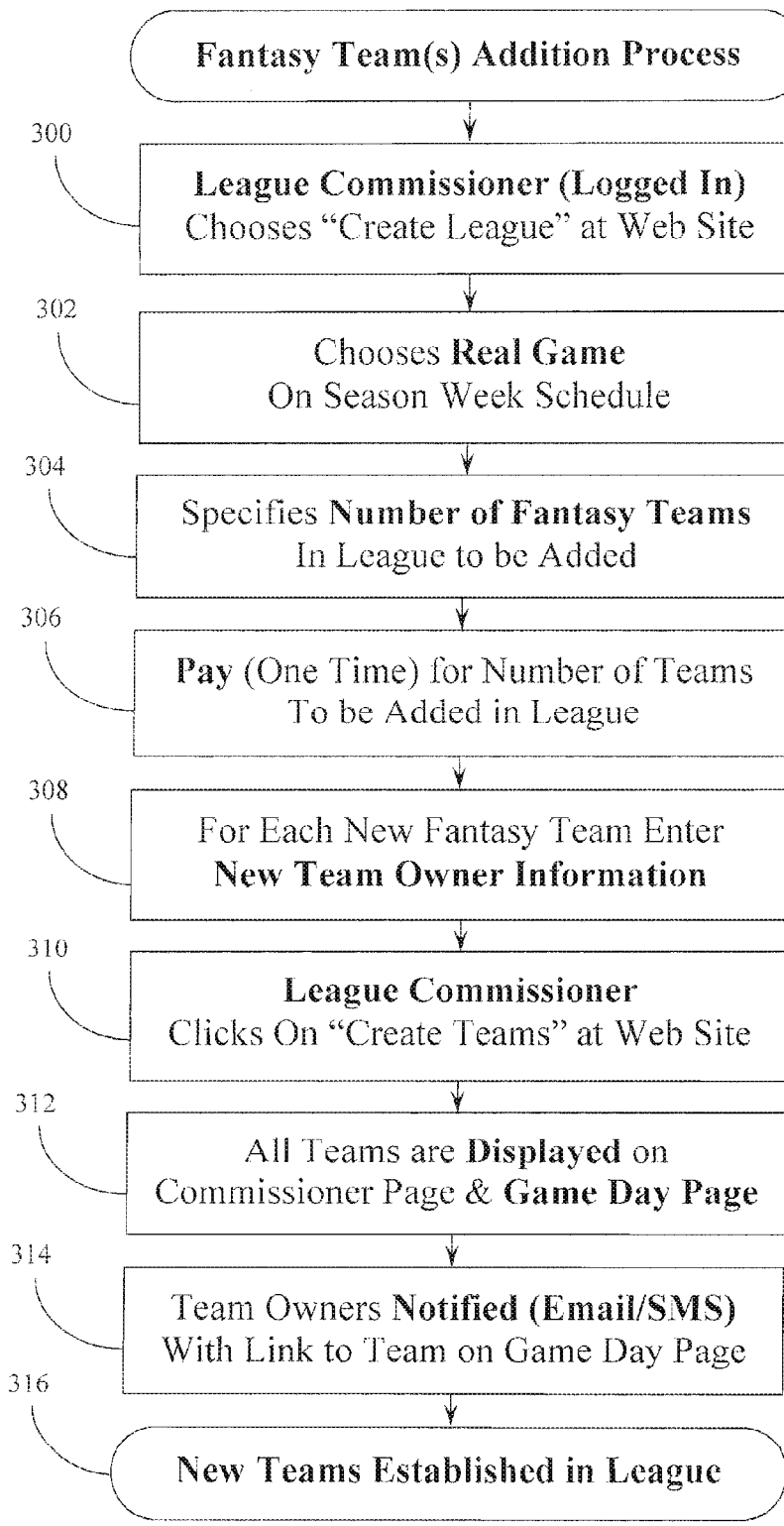
FIG. 10 is a flowchart showing the method steps associated with the process of adding fantasy teams after prior establishment of the league in the second implementation of the preferred embodiment methods of the present invention.

FIG. 9 represents the basic process for the establishment of a fantasy league and nominally identifying the fantasy teams within the league, while FIG. 10 represents the basic process for the later establishment of additional teams within an already established league. In FIG. 9, the fantasy league creation process begins at Step 280 wherein the league commissioner (that has previously logged in) chooses "create league" at the on-line website operating in the present invention. At this stage, the league commissioner chooses a real game on the sports season week schedule at Step 282. The league commissioner then specifies the number of fantasy teams within the league to be created at Step 284 followed by an on-line payment for the number of teams to be created in the league at Step 286. As indicated above, the presently described implementation of the preferred embodiment of the invention involves consolidating most of the data input and payment actions in one individual rather than dispersing these actions across each of the individual team owners that end up participating in the fantasy game. This provides a much simpler interface between the participants and the operating environment within which the game method of play is carried out.

At Step 288 the league commissioner identifies, for each fantasy team, the team owner information. Then at Step 290 the league commissioner clicks on "create teams" at the on-line website, whereafter at Step 292 the teams are displayed on the league commissioner page and additionally on the game day page that can now be established and promulgated. Finally, at Step 294 each of the term owners are notified by email or text message (SMS) of the fantasy game and are provided, through their specific notification mechanism, with a link to their team on the game day page. In contrast to traditional fantasy sports games and teams, the team owners in the present invention have little interaction with the teams that have been established on their behalf. Benefiting from the randomness of the establishment of the teams, the playing field is leveled between each of the team owners such that individuals with little or no experience in the sporting event being followed have as much of an opportunity of winning the fantasy game as those that have quite a bit of experience in the particular sporting event. This not only adds enjoyment to the game for all team owners involved, but additionally simplifies the data environment within which the fantasy league and the fantasy teams are established and operate. Since little change occurs (some change may occur as described below) within the data environment, again defined by the data schema discussed above, the system is easier to implement and to communicate across a wide area network. The result of the process shown in FIG. 9 is, as indicated at Step 296, the creation of a league and the nominal establishment of each of the fantasy teams.

A process similar to that shown in FIG. 9 is shown in FIG. 10, although FIG. 10 is structured as a sequence of steps that may be implemented to add teams to an already established league. Fantasy team addition process begins at Step 300 where the league commissioner (again in a logged in state) chooses to "create league" at the on-line website. The league commissioner chooses the real live game that is to be followed on the season week schedule at Step 302, and specifies the number of new fantasy teams in the league to be added at Step 304. The league commissioner then pays for the number of teams to be added to the league at Step 306 and for each new fantasy team enters new team owner information at Step 308. The league commissioner than clicks on "create teams" at the on-line website at Step 310 whereafter all teams are displayed on the league commissioner page and the game day page at Step 312. Once again the team owners are notified by email or text at Step 314 with links to their teams on the game day page. This team notification may occur only once for each team owner as that team is established within the league, or may occur repeatedly as any new teams are added to the league and it is desired for each of the team owners to be notified of such additions. The result of the fantasy team addition process shown in FIG. 10 is that the new teams are established within the league at Step 316.

Figure 11:
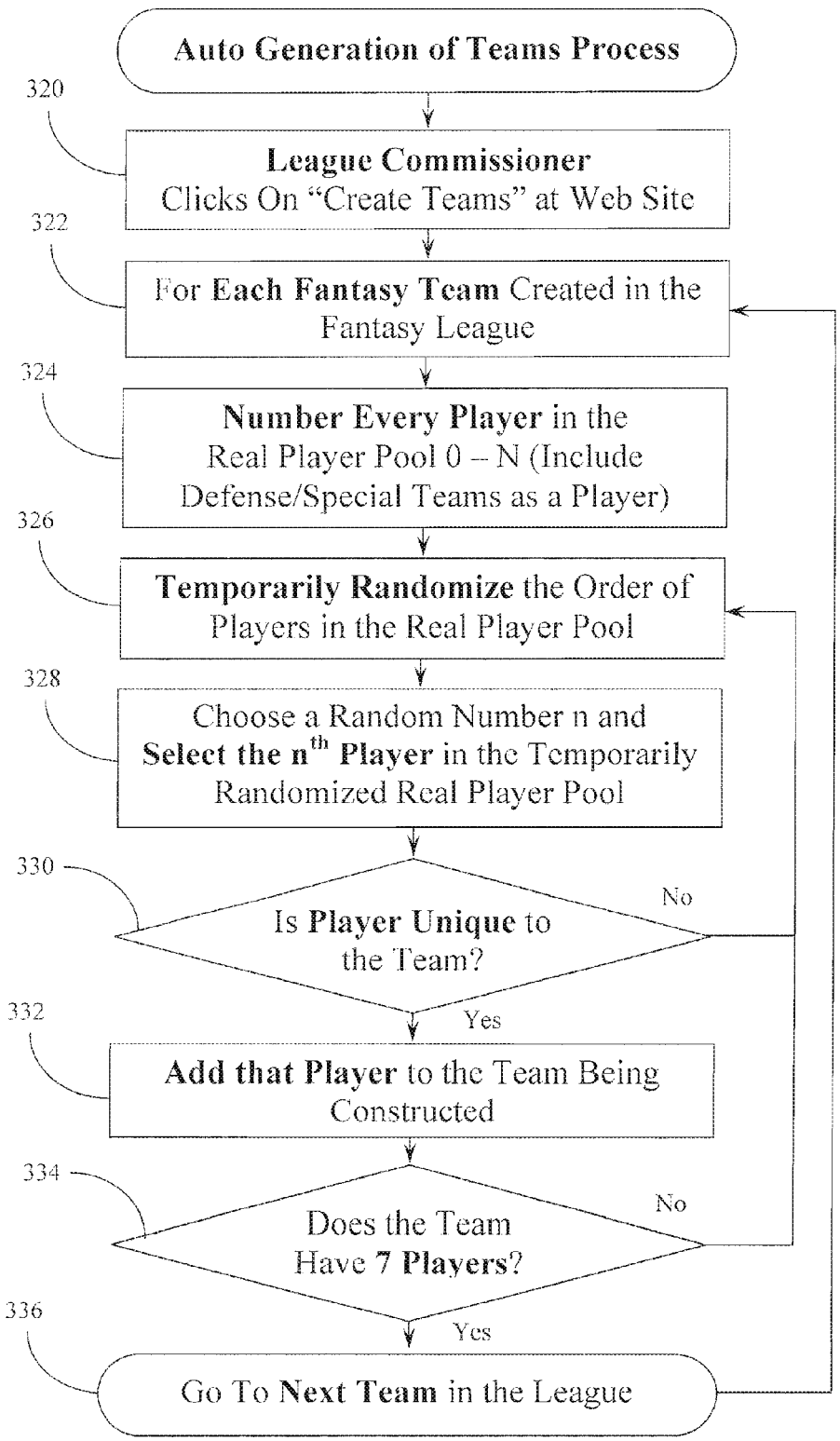
FIG. 11 is a flowchart showing the method steps associated with the process of auto generating (constructing) the fantasy teams in the second implementation of the preferred embodiment methods of the present invention.

FIG. 11 is a flowchart showing the method steps associated with the process of auto generating (constructing) the fantasy teams in this the second implementation of the preferred embodiment of the methods of the present invention. FIG. 11 describes the heart of the method of building each of the individual fantasy teams through a double randomization approach. In the example provided herein, each team is designed to have seven players. As indicated above, depending upon the sporting event being followed, this number may vary significantly. The auto generation of teams process begins at Step 320 wherein the league commissioner clicks on "create teams" at the on-line website.

For each fantasy team created in the fantasy league (Step 322) the following sequence of steps are carried out. First, every player in the real player pool is numbered 0-N. The players in the real player pool include not only individual real players, but also groups of players as may commonly be identified as an individual player within the fantasy sports environment. In the case of football, for example, it is not uncommon to identify offensive players individually (such as the quarterback, running back, wide receiver, tight end, and kicker) and to also identify as a single player the defense or special teams group of players. This characterization of a group of players as a single player for the fantasy game purpose is again highly dependent upon the nature of the sporting event being followed. The play of the groups of players may more accurately be characterized and scored as a group as opposed to individual activities. The manner of assigning a group of players the role of a single player in a fantasy game is therefore dependent upon the rules of the actual sporting event and the appropriateness with which points may be accumulated by those groups of players. Those skilled in the art will recognize when such group assignment of points may be appropriate, either by following from traditional fantasy sports league scoring methods or by recognizing that the actions that contribute to the success (or failure) of a real live team to win or lose the real game may best be characterized with a group of players as opposed to a single player.

One every player in the real player pool has been given a number, 0-N at Step 324, the process continues at Step 326 whereby the order of the players in the real player pool is temporarily randomized. In other words, the process involves randomly shuffling the order of the players so that the real players are now a new temporary set of real player numbers 0-N. Then at Step 328 the process randomly selects a number between 0-n. In other words, the method involves choosing a random number n at Step 328, and selects the player $n^{th}$ player in the temporarily randomized real player pool. The system then determines at query Step 330 whether the $n^{th}$ player selected is a player unique to the team that is currently being constructed. If not, in other words if that player had already been assigned to the team, the method returns to Step 326 where again the order of the players in the real player pool is temporarily randomized, and the process of selection begins over again. If the $n^{th}$ player is in fact unique to the team being constructed, then the process proceeds to Step 332 wherein that player is added to the team being constructed. The process then continues to query Step 334 which asks whether the team has the necessary seven players for a complete team. Here again, the number of players is highly dependent upon the rules associated with implementation of the game and by the nature of the actual sporting event being followed. Clearly, some minimum number of players on a team is desired, although conceivably anywhere from one to twenty or more players may be involved in construction of a team according to the rules of the present invention.

If the team being constructed does not yet have seven players, then the process again returns to Step 326 where the randomization and the random selection process reoccurs. If the team does have seven players, then the process concludes at Step 336 whereby the next team in the league is constructed by beginning again at Step 322 for the creation of each of the fantasy teams in the league based upon the number of teams previously identified by the league commissioner. [At this point, a question arises as to whether or not this random selection and assignment of players to each of the teams occurs only once for each team when new teams are added to an established league. In other words, once a league has been established with, say eight teams, and two new teams are thereafter added at a later time, does the randomization and selection process reoccur for all teams, or just those new teams that have been added? This question is, of course, made moot, if in fact the randomization and selection occurs only immediately prior to the initiation of the real live game, in other words after the addition of further teams has been closed.]

Figure 12:
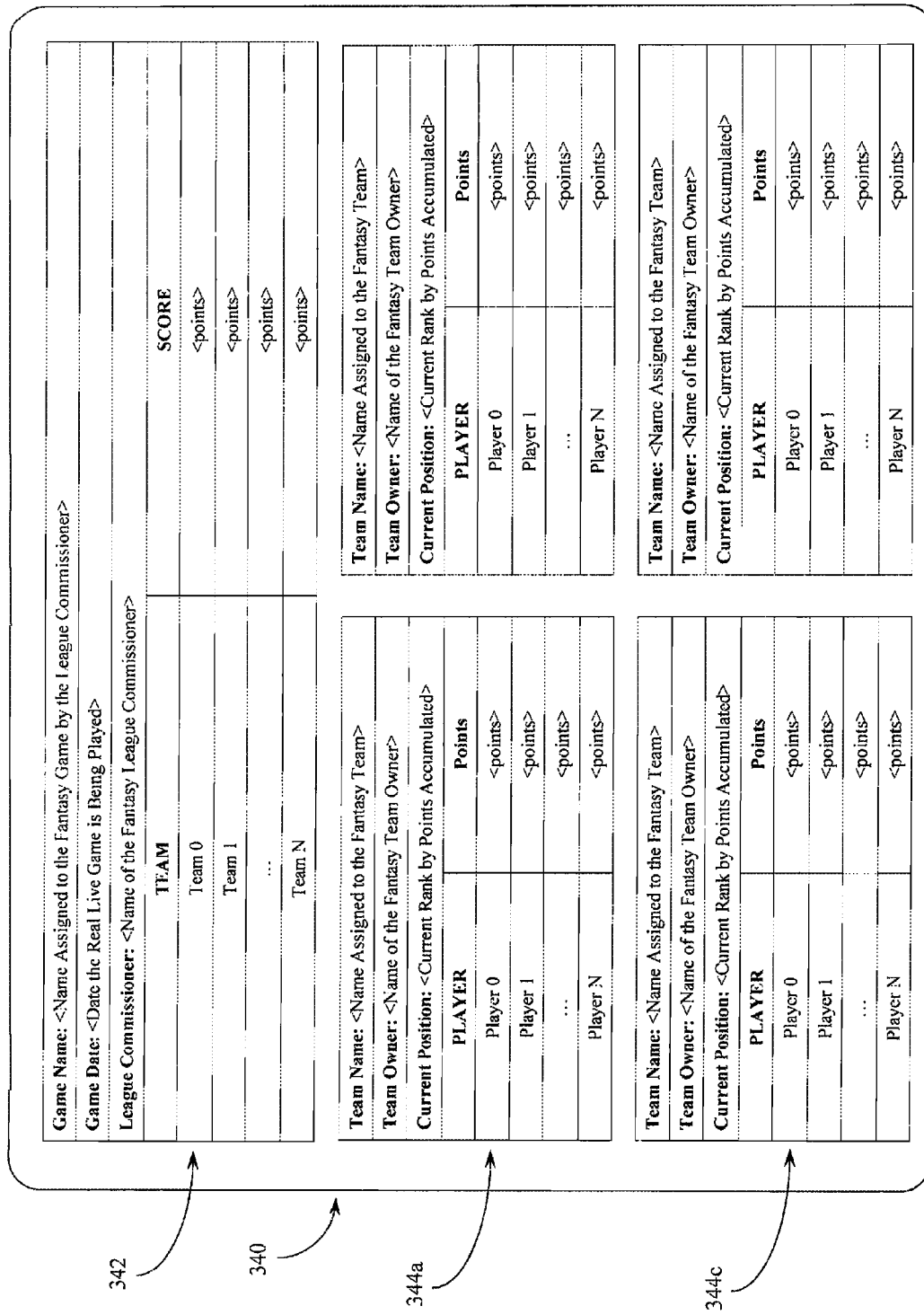
FIG. 12 is a representative screen display showing the manner of following the fantasy league and fantasy teams during a real time implementation of the second implementation of the preferred embodiment methods of the present invention.

Reference is finally made to FIG. 12 for a description of one possible embodiment of the game day page described above in association with the present invention. As indicated earlier in a description of the overall system of the present invention (FIG. 1), this game day page may be presented to each of the participants in the fantasy game on any of a number of devices that are connected to the wide area network over which the game method of play is carried out. This game day page may be presented on an individual team owner/fantasy game participants' cell phone or smart phone, or may be presented on the display screen of a desktop or laptop computer that is connected to the wide area network. Some embodiments may also allow for the presentation of the game day page as a menu screen within the broadcast video television screen presented with the actual sporting event game. In any case, the information displayed and the representative game day page shown in FIG. 12 is intended to characterize the status of the game on a real time basis.

The display 340 shown in FIG. 12 is generally configured to include a game table 342 which includes the game name, which is the name assigned to the fantasy game by the league commissioner, the game date, which is the date of the real live game being followed, and the name of the league commissioner that established the league and the specific game. Each of the teams are listed in tabular form, as well as the continuously updated real time score (points) associated with each of the fantasy teams.

Below this game table 342 are positioned a number of team tables 344a-344n. Each of the team tables (344a for example) includes information such as the team name, which is the name assigned to the fantasy team by the league commissioner, the name of the team owner if not the same as the team name, and the current rank by points accumulated as reflected in the game table 332 displayed above. For each team table 344a a column is provided listing each of the players assigned to that team and a column listing the points that those players accumulate during the play of the actual sporting event. The total of the points reflected on each team table 344a would therefore be equal to the total points represented in the game table 342 in that team's row as described above.

Those skilled in the art will recognize that the fantasy league commissioner in the methods of the present invention need not be a natural person or even one of the fantasy team owners. A fantasy game may be organized by a non-person entity such as a business establishment (a bar or restaurant, for example) and may even be a coordinated entity holding a very large audience such as a stadium or an arena. An alternate embodiment of the present invention includes a method whereby the "league commissioner" establishes the league with an undetermined number of teams. A general invitation to any and all potential team owners may be "broadcast" to those individuals within a given geographic location or within a defined group capable of receiving and responding to the invitation. Within a defined location (for example, the stadium where the live sporting event is being held) an invitation to participate in the fantasy game might be "broadcast" (over the public address system, on the scoreboard, on the ticket stub, etc.) and individual fantasy team owners may establish themselves (by text message from a cell phone, by logging in from a PDA or smart phone, by calling a phone number, by signing in at a stadium kiosk, etc.) and be assigned a fantasy team according to the methods described above. The game day page may be accessible to each of the fantasy team owners or they may simply have access to the final results after completion of the real game. The basic methods of the present invention as described above may therefore be adapted to accommodate large numbers of self enrolled fantasy team owners.

Although the present invention has been described in terms of the foregoing preferred embodiments, this description has been provided by way of explanation only, and is not intended to be construed as a limitation of the invention. Those skilled in the art will recognize modifications of the present invention that might accommodate specific real life sporting events and real life sports game methods of play. Such modifications, as to numbers of teams, numbers of players, points allotted for player performances, and methods of tracking and viewing the competitions, where such modifications are coincidental to the type of sporting event being followed, do not necessarily depart from the spirit and scope of the invention.

We claim:

1. A fantasy sports competition game method of play comprising the steps of:
   (a) selecting a single actual live sporting event to occur in the immediate future between two actual teams made up of actual sports players, the single actual live sporting event to be followed and associated with the play of the fantasy sports competition;
   (b) enrolling a plurality of fantasy game players into the fantasy sports competition as fantasy team owners for a corresponding number of fantasy teams;
   (c) randomly assigning a plurality of the actual sports players to each of the fantasy teams, each of the fantasy teams being assigned the same number of actual sports players while the specific actual sports players randomly assigned may vary between fantasy teams, the step of randomly assigning a plurality of actual sports players to each of the fantasy teams comprising randomly choosing from a pool of all actual sports players on the two actual teams to complete a fantasy team and returning all actual sports players to the pool to be randomly chosen from to complete a next fantasy team, wherein the same actual sports player may end up being assigned to more than one fantasy team;
   (d) tracking the performance of the assigned actual sports players during the play of the actual live sporting event;
   (e) assigning points to the tracked performance of each of the assigned actual sports players and associating those assigned points with each fantasy team to which those actual sports players are assigned;
   (f) each fantasy team accumulating points during the play of the single actual live sporting event based upon the performance of the actual sports players randomly assigned to that fantasy team; and
   (g) upon the completion of the single actual live sporting event, totaling the accumulated points for each fantasy team and declaring a winner based upon the fantasy team with the most points.

2. A game method of play for a fantasy sports competition based upon the actions and events associated with one single real sporting event selected from a plurality of scheduled real sporting event competitions events between real sports teams, the game method of play comprising the steps of:
   (a) providing an electronic data processing (EDP) system comprising at least one data processing device, at least one data storage device, at least one data input device, a data communication network, and a plurality of display devices;
   (b) providing a source of statistical data associated with the real sports teams; real players on the real sports teams; and real play of the plurality of scheduled real sporting event competitions events involving the real sports teams, the source of statistical data being in electronic data communication with the electronic data processing system;
   (c) selecting one single real sporting event competition from the plurality of scheduled real sporting event competitions events between two real sports teams to provide a basis for the fantasy sports competition and entering data identifying the selection into the EDP system;
   (d) establishing a fantasy league made up of a plurality of fantasy teams and entering data identifying the fantasy league and the fantasy teams into the EDP system;
   (e) for each of the plurality of fantasy teams, operating the EDP system to randomly assign a plurality of real players from the two real sports teams to the fantasy team as fantasy players, the step of randomly assigning a plurality of real players comprising randomly choosing from a pool of all real players on the two real sports teams to complete a fantasy team and returning all real players to the pool to be randomly chosen from to complete a next fantasy team, wherein the same real player may end up being assigned to more than one fantasy team
   (f) receiving into the EDP system statistical data associated with the two real sports teams; the real players on the two real sports teams; and the real play of the selected scheduled one single real sporting event competition;
   (g) assigning points to each of the fantasy players of the fantasy teams based upon the statistical data associated with the actions of the corresponding real players in the real play of the selected scheduled one single real sporting event competition;
   (h) repeating the step of assigning points to the fantasy players though out the real play of the selected scheduled one single real sporting event competition, to the conclusion of the selected scheduled one single real sporting event competition;
   (i) for each of the fantasy teams, totaling the assigned points for all fantasy players established on that fantasy team; and
   (j) comparing the totaled assigned points for each fantasy team and declaring a winner of the fantasy game based upon the totaled assigned points.

3. The method of claim 2 further comprising the step of associating each of the fantasy teams with a fantasy team owner, each of the fantasy team owners comprising one or more live individual persons.

4. The method of claim 3 further comprising the step of locating each of the fantasy team owners physically present together during the real play of the selected scheduled real sporting event competition.

5. The method of claim 4 further comprising the step of each of the fantasy team owners watching the real play of the selected scheduled real sporting event competition on a television.

6. The method of claim 4 further comprising the step of each of the fantasy team owners attending the real play of the selected scheduled real sporting event competition.

7. The method of claim 3 further comprising the step of locating each of the fantasy team owners physically in at least two disparate locations during the real play of the selected scheduled real sporting event competition.

8. The method of claim 7 further comprising the step of at least one of the fantasy team owners watching the real play of the selected scheduled real sporting event competition on a smart phone mobile device.

9. The method of claim 3 wherein the step of establishing a fantasy league comprises each of the fantasy team owners registering a fantasy team for participation in the fantasy game, the step of registering comprising each of the fantasy team owners electronically accessing the EDP system.

10. The method of claim 9 further comprising the step of at least one of the fantasy team owners electronically accessing the EDP system with a smart phone mobile device.

* * * * *